(12) United States Patent
Kurasawa

(10) Patent No.: US 8,004,644 B2
(45) Date of Patent: Aug. 23, 2011

(54) LIQUID CRYSTAL DISPLAY DEVICE

(75) Inventor: Hayato Kurasawa, Tottori (JP)

(73) Assignee: Sony Corporation, Tokyo (JP)

( * ) Notice: Subject to any disclaimer, the term of this patent is extended or adjusted under 35 U.S.C. 154(b) by 231 days.

(21) Appl. No.: 12/494,676

(22) Filed: Jun. 30, 2009

(65) Prior Publication Data

US 2010/0128208 A1    May 27, 2010

(30) Foreign Application Priority Data

Nov. 27, 2008   (JP) .................................. 2008-302016

(51) Int. Cl.
*G02F 1/1343*   (2006.01)

(52) U.S. Cl. ........................................................ 349/141

(58) Field of Classification Search .................... 349/141
See application file for complete search history.

(56) References Cited

U.S. PATENT DOCUMENTS 5,995,182 A * 11/1999 Watanabe et al. .............. 349/110
6,914,656 B2 * 7/2005 Sakamoto et al. ............. 349/141

FOREIGN PATENT DOCUMENTS

| JP | 2007-178736 | 7/2007 |
| JP | 2008-209529 | 9/2008 |

* cited by examiner

*Primary Examiner* — James A Dudek
(74) *Attorney, Agent, or Firm* — K&L Gates LLP

(57) ABSTRACT

A liquid crystal display device includes a first substrate and a second substrate which face each other with a liquid crystal layer interposed therebetween, in which a display sub-pixel and a viewing angle control sub-pixel are placed adjacently to each other for each of pixels, wherein the first substrate is provided with a pixel electrode and a common electrode driven by a lateral electric field mode in the display sub-pixel and is provided with a viewing angle control electrode in the viewing angle control sub-pixel, and in which the second substrate is provided with a transparent conductive electrode formed to overlap with both of the display sub-pixel and the viewing angle control sub-pixel on a liquid crystal layer side.

9 Claims, 11 Drawing Sheets

LIQUID CRYSTAL DISPLAY DEVICE

This application claims the benefit of Japanese Patent Application No. 2008-302016, filed on Nov. 27, 2008. The entire disclosures of the prior applications are hereby incorporated by reference herein in their entirety.

BACKGROUND

1. Technical Field

The present invention relates to a liquid crystal display device equipped with a viewing angle control sub-pixel, and more particularly to a liquid crystal display device equipped with a viewing angle control sub-pixel, in which a display sub-pixel is driven by a lateral electric field mode and a viewing angle control sub-pixel is driven by a longitudinal electric field mode, and which has a good viewing angle control characteristic.

2. Related Art

Liquid crystal display devices are widely used in many electronic apparatuses as display units because they are advantageous over cathode ray tubes in that they are light weigh and thin and consume less electric power compared to the cathode ray tubes. The liquid crystal display device is made to display an image by changing orientation of liquid crystal molecules arranged in a predetermined direction by electric field to change optical transmittance of a liquid crystal layer. There are liquid crystal display devices including reflective type liquid crystal display devices operating in a way in which an ambient ray enters the liquid crystal layer, is then reflected from a reflective plate, and finally penetrates through and exits the liquid crystal layer, transmissive type liquid crystal display devices operating in a way in which an incident ray from a backlight unit penetrates through the liquid crystal layer, and transflective liquid crystal display devices operating in both ways.

As for the method of applying electric field to the liquid crystal layer of the liquid crystal display device, there are a longitudinal electric field mode and a lateral electric field mode. In the longitudinal electric field type liquid crystal display device, most longitudinal electrical field is applied to liquid crystal molecules by a pair of electrodes placed with a liquid crystal layer interposed therebetween. There are known modes of the longitudinal electric field type liquid crystal display devices, such as Twisted Nematic (TN) mode, Vertical Alignment (VA) mode, and Multi-domain Vertical Alignment (MVA). In the lateral electric field type liquid crystal display device, a pair of electrodes is provided at the inside surface of any one substrate of a pair of substrates placed with a liquid crystal layer interposed therebetween in a state in which they are electrically isolated, and most lateral electric field is applied to liquid crystal molecules. There are known modes of the lateral electric field type liquid crystal display devices, such as In-Plane Switching (IPS) mode in which a pair of electrodes does not overlap each other in a plan view and Fringe Field Switching (FFS) mode in which a pair of electrodes overlaps each other in a plan view.

In the IPS mode liquid crystal display panel, a pair of electrodes consisting of a pixel electrode and a common electrode is formed in the form of comb teeth which interdigitate with each other, while they are electrically isolated from each other, and a lateral direction electric field between the pixel electrode and the common electrode is applied to liquid crystal. The IPS mode liquid crystal display devices are advantageous over the longitudinal electric field type liquid crystal display devices in that they have a wide viewing angle.

The FFS mode liquid crystal display device has a structure in which a pair of electrodes consisted of a common electrode and a pixel electrode is placed in different layers, having an insulating film interposed therebetween, either the common electrode or the pixel electrode at the liquid crystal layer side has slit-like openings, and most lateral direction electric field passing through the slit-like openings is applied to the liquid crystal layer. Since the FFS mode liquid crystal display device is advantageous in that it can improve image contrast as well as has a wide viewing angle, it has become widely used device in recent years. The FFS mode liquid crystal display devices can be classified into a first type in which the pixel electrode is formed at the same plane as Thin Film Transistors (TFTs) serving as switching elements and a second type in which the common electrode and the pixel electrode are placed over the TFTs. The second type FFS mode liquid crystal display device in which the common electrode and the pixel electrode are placed over the TFTs has a structure in which the surfaces of the TFTs and so on are covered with an interlayer film made of resin and a lower electrode made of a transparent conductive material is formed on the surface of the interlayer film. The lower electrode can serve as any of the pixel electrode and the common electrode.

As described above, the lateral electric field type liquid crystal display device has a wide viewing angle. However, a narrow viewing angle may be preferable in the case of displaying confidential information to keep people from recognizing the confidential information. Accordingly, JP-A-2007-178736 disadjacents a liquid crystal display device in which a viewing angle control sub-pixel operating in a FFS mode is provided adjacent to a display region, which operates in the FFS mode, to narrow the viewing angle. In the viewing angle control sub-pixel, narrowing of the viewing angle can be accomplished by differently setting orientation of liquid crystal molecules of the viewing angle control sub-pixel from orientation of liquid crystal molecules of the display sub-pixel in a way of applying electric field which is different from electric field used in the display sub-pixel to the liquid crystal molecules of the viewing angle control sub-pixel.

In the longitudinal electric field type liquid crystal display device, the common electrode is formed on a display surface of a transparent substrate. However, in the lateral electric field type liquid crystal display device, since the common electrode is not formed on the display surface of the transparent substrate, orientation of the liquid crystal molecules can be disordered owing to electrostatic charge from fingers of a person and so on. Accordingly, JP-A-2008-209529 disadjacents a liquid crystal display device in which an anti-electrostatic charge transparent conductive electrode is formed on the outer surface of a transparent substrate at the display surface side of the lateral electric field liquid crystal display device to prevent an image from being cluttered owing to the electrostatic charge.

However, in the liquid crystal display device disadjacentd in JP-A-2007-178736, the viewing angle control sub-pixel operates in the FFS mode as in the display sub-pixel. Accordingly, the liquid crystal display device has drawbacks such that viewing angle control effect is weak and light leakage attributable to orientation disorder of the liquid crystal molecules is likely to occur because the liquid crystal molecules are forced to stand up by the fringe electric field, and the liquid crystal display device requires a high driving voltage. On the other hand, the liquid crystal display device disadjacentd in JP-A-2008-209529 has drawbacks such that it can be easily scratched and it is difficult to ground the liquid crystal display device because the anti-electrostatic charge transparent conductive electrode is formed on a display surface of a transparent glass substrate of a color filter substrate.

SUMMARY

An advantage of some aspects of the invention is that it provided a liquid crystal display device driven by a lateral electric field mode, which has strong viewing angle control effect, does not allow light leakage attributable to orientation disorder of light crystal molecules to occur, operates at a low driving voltage, and can improve cost effectiveness and reliability by effectively using characteristics of a transparent conductive electrode.

In order to accomplish such an object of the invention, there is provided a liquid crystal display device including a first substrate and a second substrate which face each other with a liquid crystal layer interposed therebetween, in which a display sub-pixel and a viewing angle control sub-pixel are placed adjacent to each other for each of pixels, wherein the first substrate is provided with a pixel electrode and a common electrode driven by a lateral electric field mode in the display sub-pixel and is provided with a viewing angle control electrode in the viewing angle control sub-pixel, and in which the second substrate is provided with a transparent conductive electrode formed to overlap with both of the display sub-pixel and the viewing angle control sub-pixel on a liquid crystal layer side.

In the liquid crystal display device of the invention, the display sub-pixel is provided with the pixel electrode and the common electrode which are formed on the first substrate, driven by a lateral electric field mode, and can be driven in an IPS mode or an FFS mode according to placement of the electrodes. The viewing angle control sub-pixel is provided with a viewing angle control electrode formed on the first substrate and a transparent conductive electrode formed on the second substrate, and the liquid crystal display device operates as a longitudinal electric field type liquid crystal display device. Accordingly, according to the liquid crystal display device of the invention, the viewing angle control sub-pixel can relatively easily make liquid crystal molecules vertically stand up compared to existing viewing angle control sub-pixels. Therefore, it is possible to attain good viewing angle control effect.

Further, since the transparent conductive electrode formed on the second substrate on a display sub-pixel region is formed to overlap with both of the display sub-pixel and the viewing angle control sub-pixel, it serves as an anti-electrostatic charge shielding electrode. Accordingly, according to the liquid crystal display device of the invention, it is possible to provide a cheap liquid crystal display device because there is no need to provide additional shielding members on the display surface of the liquid crystal display device.

In addition, according to the liquid crystal display device of the invention, since it is possible to make a cell gap of the viewing angle control sub-pixels larger than that of the display sub-pixels, it is possible to attain physically good viewing angle control effect. Furthermore, since it is possible to drive the viewing angle control sub-pixel by a longitudinal electric field mode, it is possible to attain improved viewing angle control effect, reduce the chance of light leakage attributable to orientation disorder of liquid crystal molecules, and lower a driving voltage for attaining the same viewing angle control effect compared to the liquid crystal display device disadjacentd in JP-A-2007-178736.

Further, in the liquid crystal display device of the invention, it is preferable that the liquid crystal alignment is a homogeneous alignment and a rubbing direction of an and an optical axis direction of liquid crystal with respect to the rubbing direction in the viewing angle control sub-pixel is the same as those of the display sub-pixel.

When the homogeneously aligned liquid crystal is used and the rubbing direction of the of the viewing angle control sub-pixel and the optical axis direction of the liquid crystal with respect to the rubbing direction are the same direction as those of the display sub-pixel, the lateral electric field type liquid crystal and the longitudinal electric field type liquid crystal can be implemented by use of the same the same kind of liquid crystal. Accordingly, according to the liquid crystal display device of the invention, since it is not necessary to provide a barrier rib between the display sub-pixel and the viewing angle control sub-pixel to keep the liquid crystal layers of the display sub-pixel and the viewing angle control sub-pixel from blending into each other, it is possible to obtain a liquid crystal display device having a simple structure and very good viewing angle control effect.

In the liquid crystal display device of the invention, it is preferable that the transparent conductive electrode is formed in the lowermost layer of the second substrate.

In the invention, the term "the lowermost layer" is used to indicate a layer formed on a transparent substrate in the first place in manufacturing process of the first substrate and the second substrate. According to the liquid crystal display device of the invention, since the transparent conductive electrode of the second substrate is formed in the lowermost layer, the electrode of the display sub-pixel of the first substrate and the transparent conductive electrode of the second substrate are spaced apart from each other to the maximum extent possible. Accordingly, effect of the transparent conductive electrode on the display electric field becomes less. For such a reason, according to the liquid crystal display device of the invention, it is possible to obtain a liquid crystal display device less affected by external factor, such as electrostatic charge, and having good display quality.

In the liquid crystal display device of the invention, it is preferable that a pixel electrode and a common electrode driven by the lateral electric field mode are driven in an FFS mode and composed of a lower side common electrode and an upper pixel electrode provided with a plurality of slits, which are formed with an insulating film interposed therebetween.

In the case of driving the display sub-pixel in the FFS mode, if the upper electrode serves as the pixel electrode, a structure of a contact hole used to connect the pixel electrode of the display sub-pixel to a switching element becomes the same as a structure of a contact hole used to connect the viewing angle control electrode of the viewing angle control sub-pixel to the switching element. Accordingly, according to the liquid crystal display device of the invention, since it is possible to simultaneously form the contact holes for the display sub-pixel and the viewing angle control electrode, manufacturing of the liquid crystal display device is simplified.

In the liquid crystal display device of the invention, the pixel electrode and the common electrode driven by the lateral electric field mode are driven in the FFS mode and composed of a lower side pixel electrode and an upper side common electrode with a plurality of slits, which are formed with an insulating film interposed therebetween.

In the case of driving the display sub-pixel in the FFS, if the upper electrode serves as the common electrode, the distance between the common electrode and the transparent conductive electrode is shorter than that between the pixel electrode and the transparent conductive electrode. Accordingly, the lower electrode serving as the pixel electrode becomes hardly affected by the electric field generated with respect to the transparent conductive electrode. Accordingly, according to the liquid crystal display device of the invention, it is possible to provide a liquid crystal display device which is less affected by external electrostatic charge and has good display quality.

In the liquid crystal display device of the invention, it is preferable that the viewing angle control electrode is formed in the same layer as the lower pixel electrode.

The viewing angle control electrode needs to be connected to a drain electrode via the contact hole. However, in the case in which the pixel electrode which is a lower side electrode needs to be connected to the drain electrode, manufacturing becomes simple because it is possible to simultaneously manufacture both of them.

In the liquid crystal display device of the invention, it is preferable that the second substrate has a resinous light shielding member and the transparent conductive electrode is formed to cover a surface of the second substrate including the resinous light shielding member.

If the resinous light shielding member is in direct contact with the liquid crystal layer, there is possibility that the resinous light shielding member deteriorates the liquid crystal layer as impurities from the resinous light shielding member elutes into the liquid crystal layer. Therefore, a top coat layer is needed in the past. According to the liquid crystal display device of the invention, since the transparent conductive electrode is formed on the surface of the resinous light shielding member, the possibility that the impurities in the resinous light shielding member elute into the liquid crystal layer decreases even though the top coat layer is omitted. Accordingly, manufacturing becomes simple.

In the liquid crystal display device of the invention, it is preferable that the second substrate has a color filter layer and the transparent conductive electrode is formed to cover the color filter layer.

If the color filter layer is in direct contact with the liquid crystal layer, the color filter layer can deteriorate the liquid crystal layer since impurities from the color filter layer elutes into the liquid crystal layer. Therefore, a top coat layer is needed in the past. According to the liquid crystal display device of the invention, since the transparent conductive electrode is formed on the surface of the color filter layer, the possibility that the impurities in the color filter layer elute into the liquid crystal layer decreases even though the top coat layer is omitted. Accordingly, manufacturing becomes simple.

In the liquid crystal display device of the invention, it is preferable that a common voltage is applied to the transparent conductive electrode.

The transparent conductive electrode formed on the second substrate has shielding effect and viewing angle control effect even in a floating state, but if the transparent conductive electrode is in a state in which it is applied with the common voltage, in the viewing angle control pixel, burning hardly occurs and viewing angle control effect can be surely attained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, best forms for practicing the invention will be described with reference to embodiments and drawings, but the below-described embodiments are not intended to limit the invention to the description herein and the invention can be equivalently applied to various modifications thereof without departing from technical spirit of claims.

Figure 1:
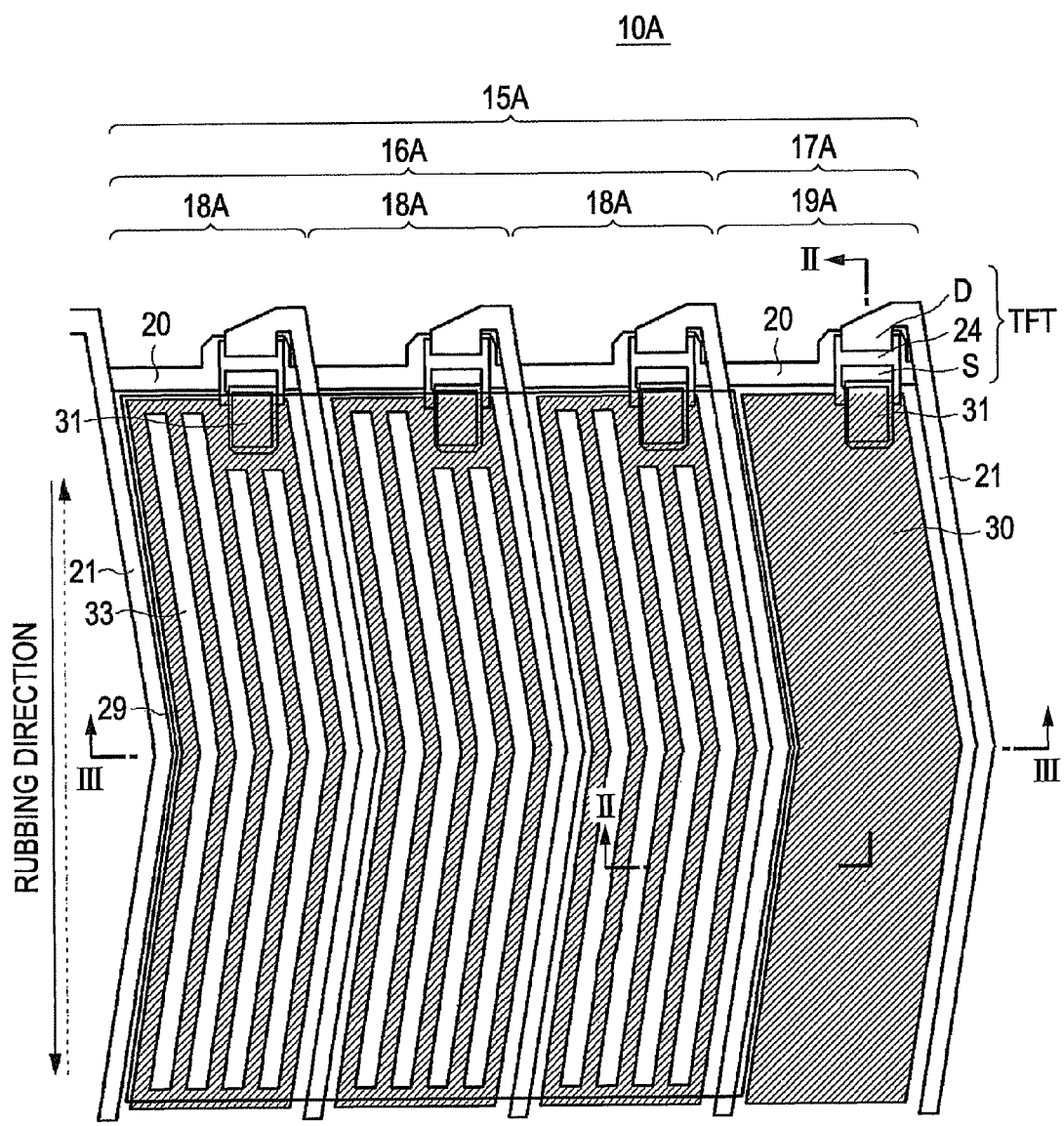
FIG. 1 is a plan view illustrating one pixel of a liquid crystal display device according to a first embodiment of the invention by projecting it through a color filter substrate.
Figure 2:
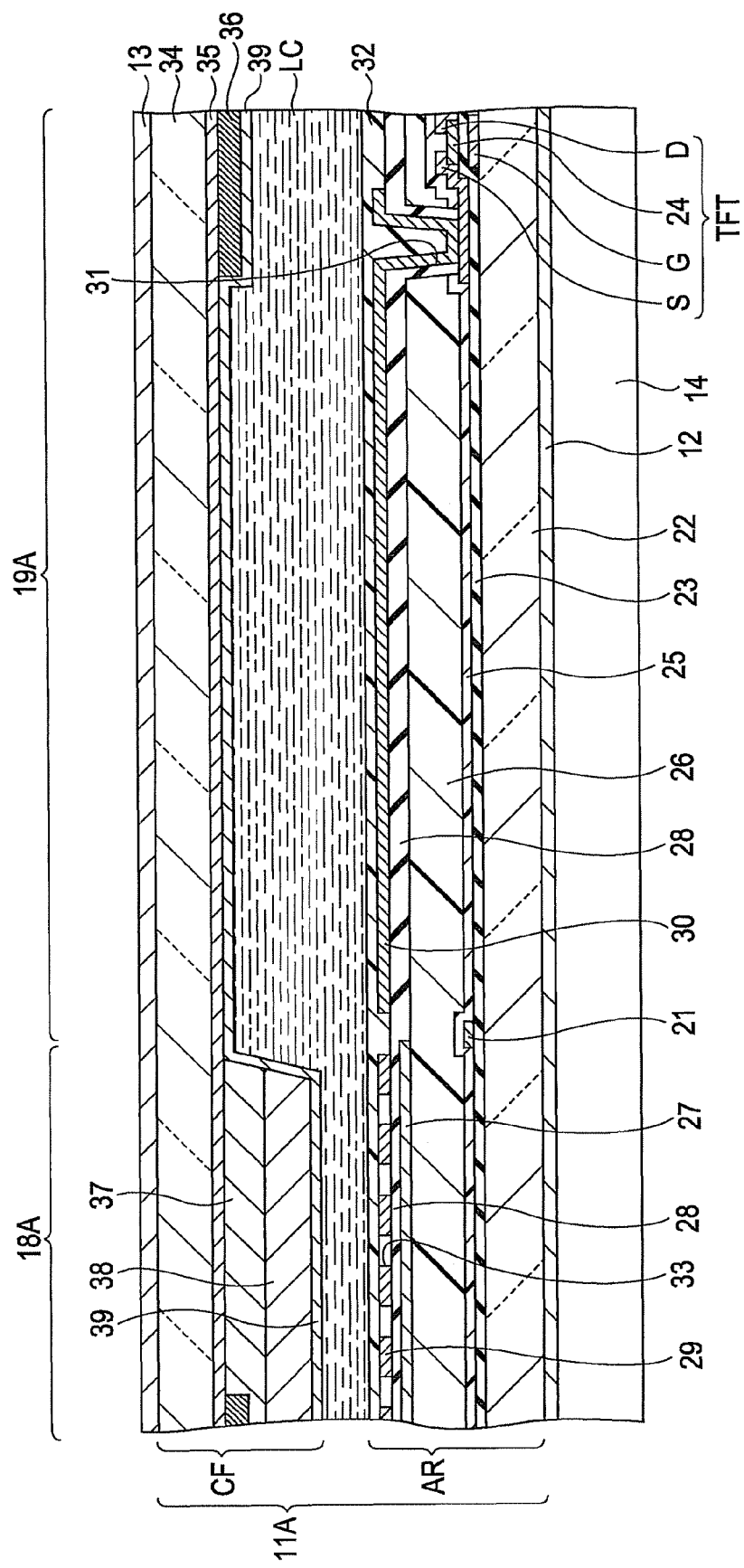
FIG. 2 is a sectional view projected in the direction of an arrow of line II-II of FIG. 1.
Figure 3:
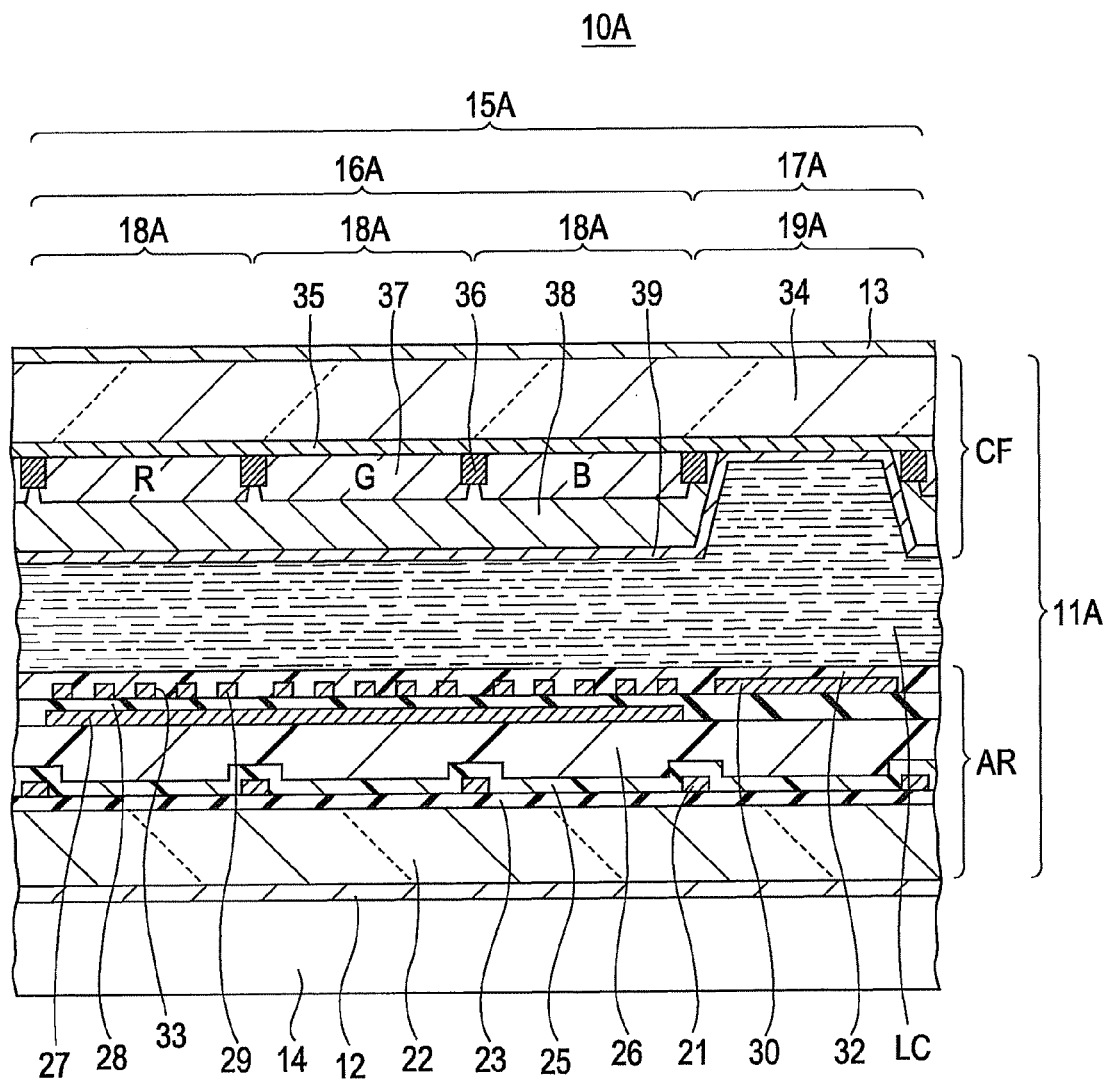
FIG. 3 is a sectional view projected in the direction of an arrow of line III-III of FIG. 1 of the first embodiment.
Figure 4:
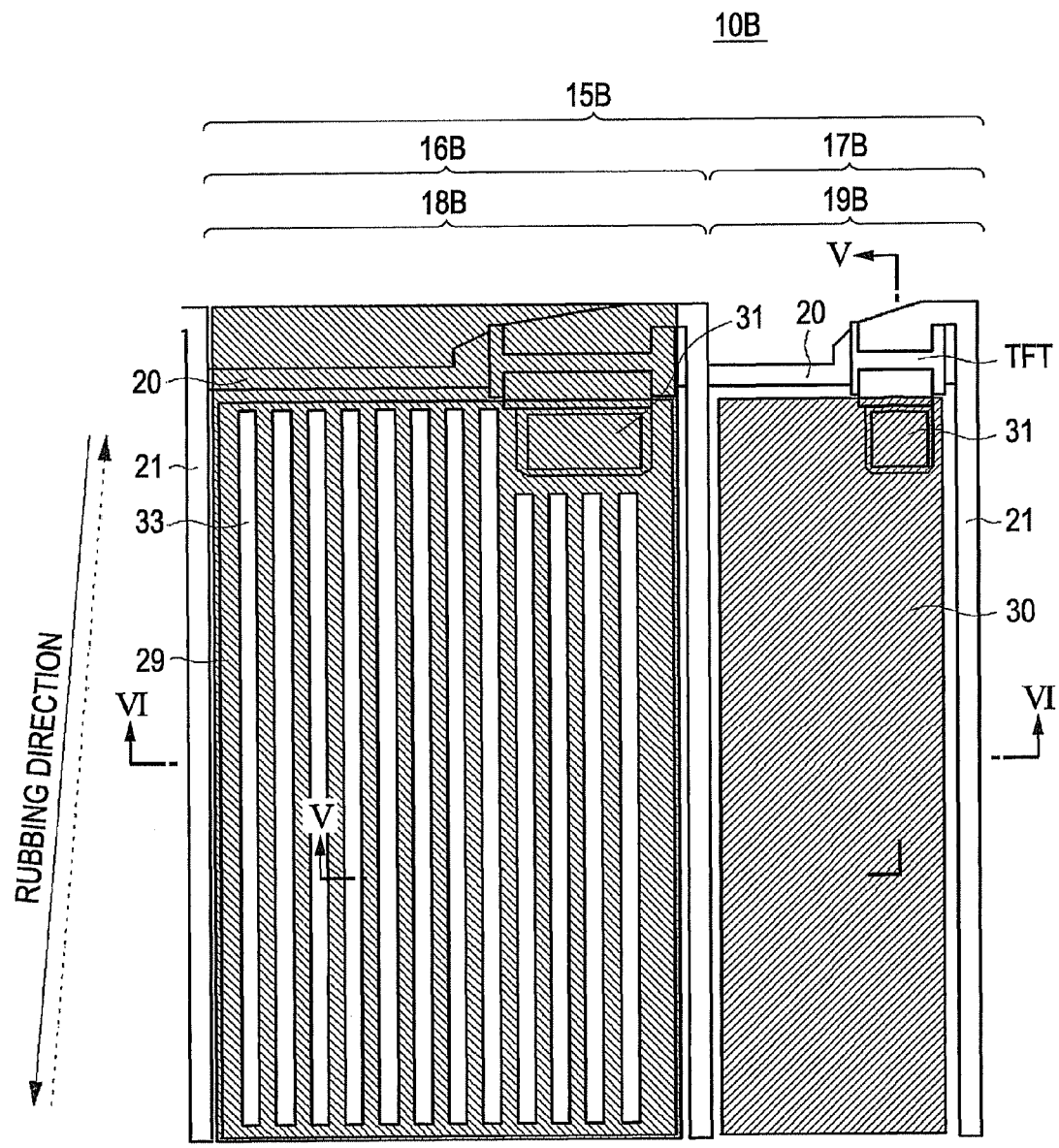
FIG. 4 is a plan view illustrating one pixel of a liquid crystal display device according to a second embodiment of the invention by projecting it through a color filter substrate.
Figure 5:
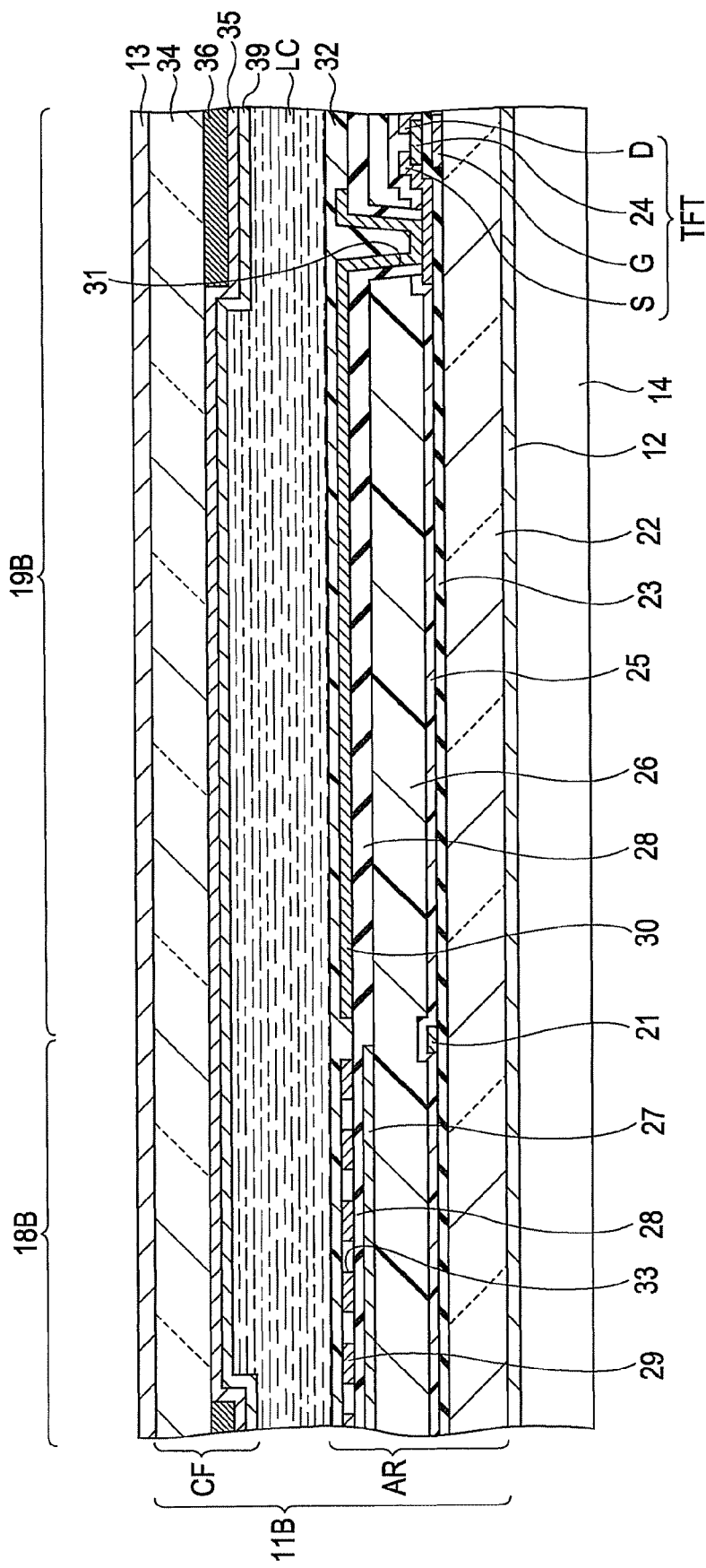
FIG. 5 is a sectional view projected in the direction of an arrow of line V-V of FIG. 4.
Figure 6:
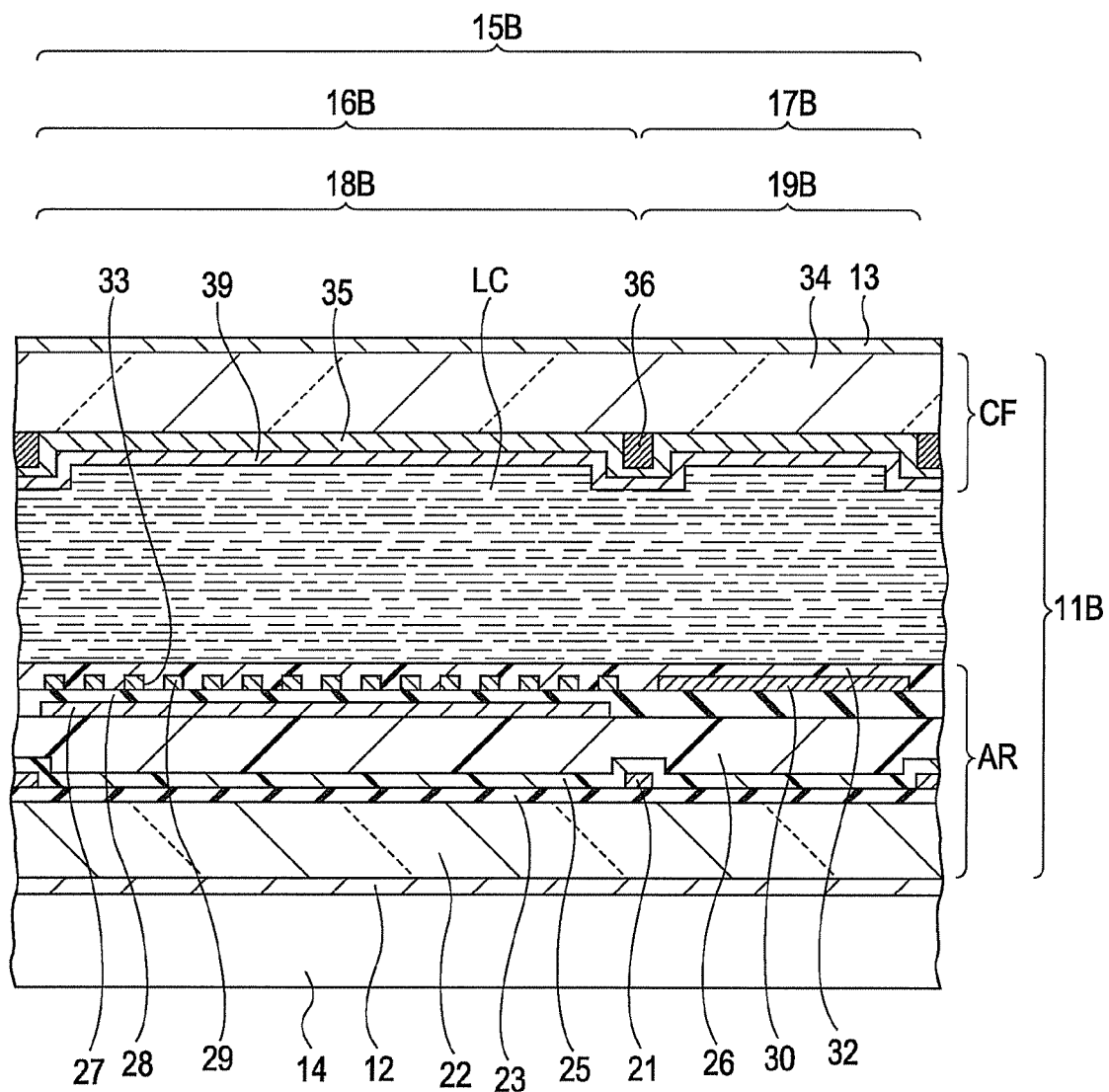
FIG. 6 is a sectional view projected in the direction of an arrow of line VI-VI of FIG. 4.
Figure 7:
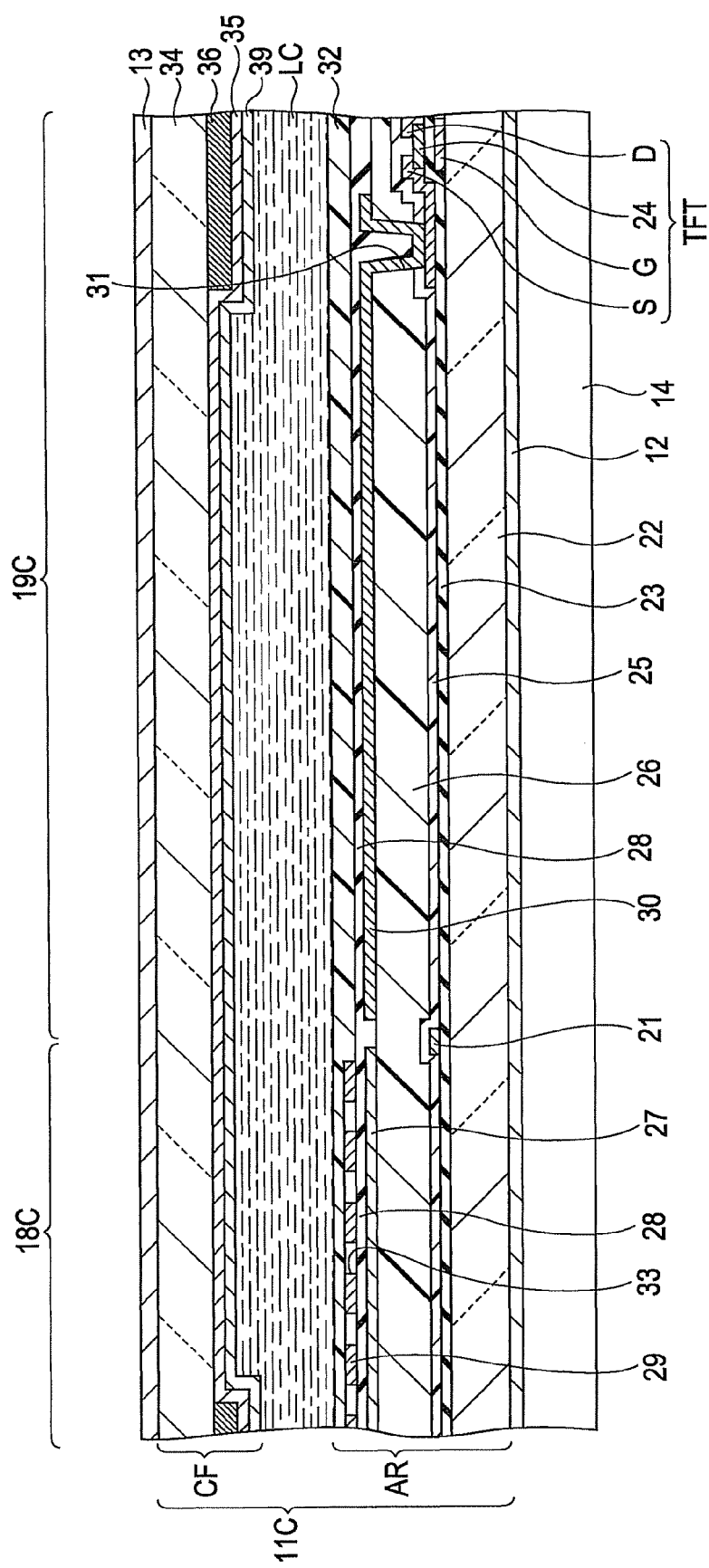
FIG. 7 is a sectional view illustrating a modification of the second embodiment corresponding to FIG. 5.
Figure 8:
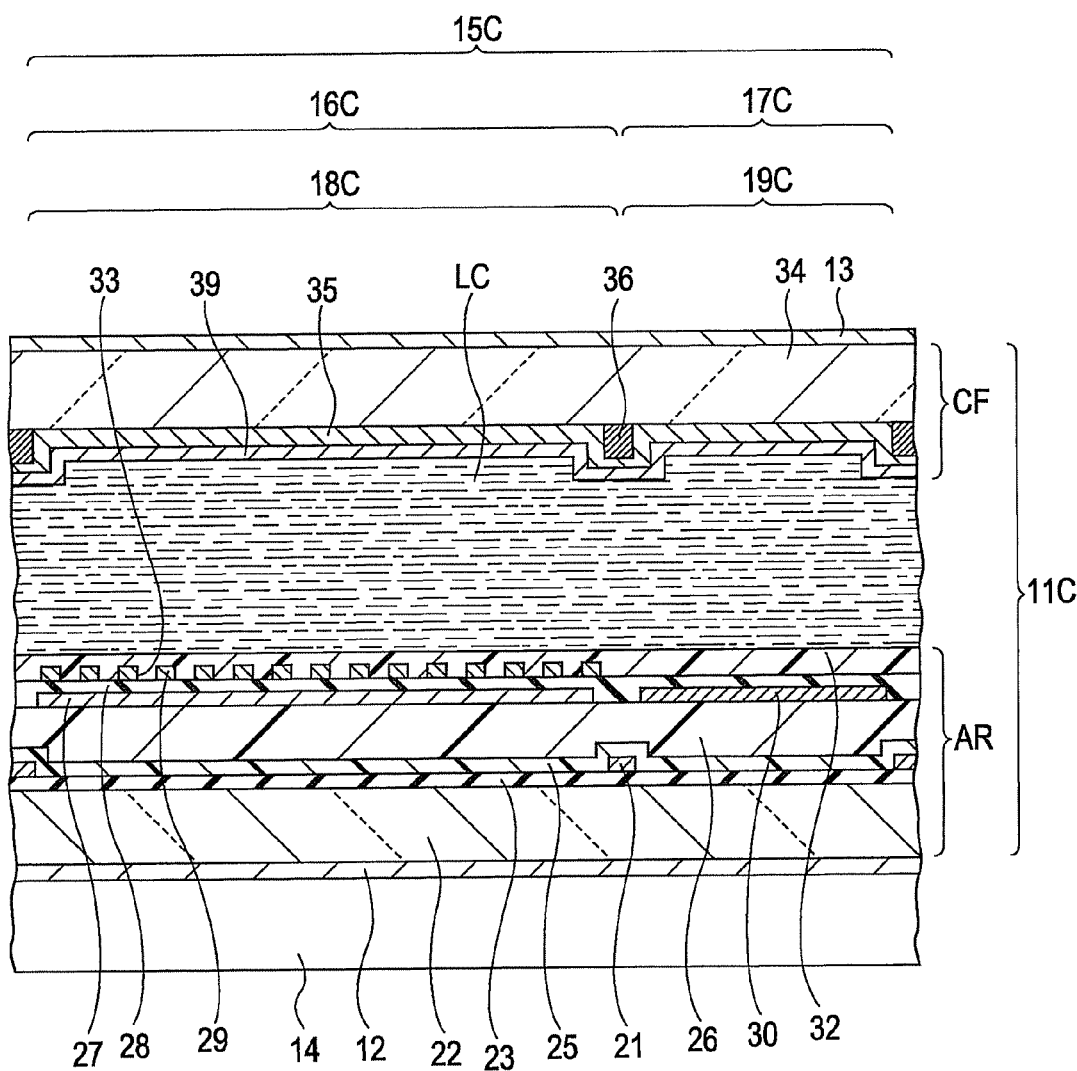
FIG. 8 is a sectional view illustrating a modification of the second embodiment corresponding to FIG. 6.
Figure 9:
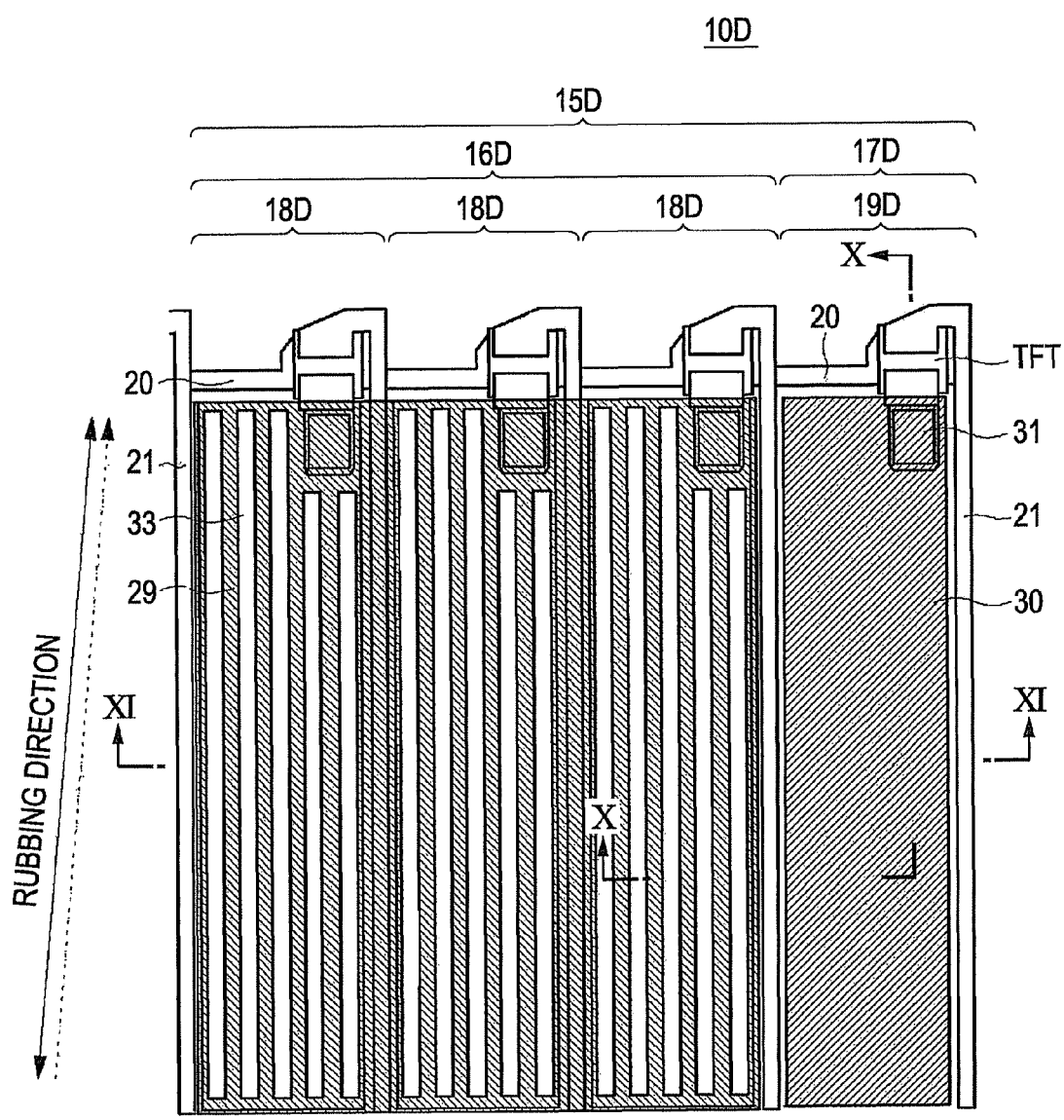
FIG. 9 is a plan view illustrating one pixel of a liquid crystal display device according to a third embodiment by projecting it through a color filter substrate.
Figure 10:
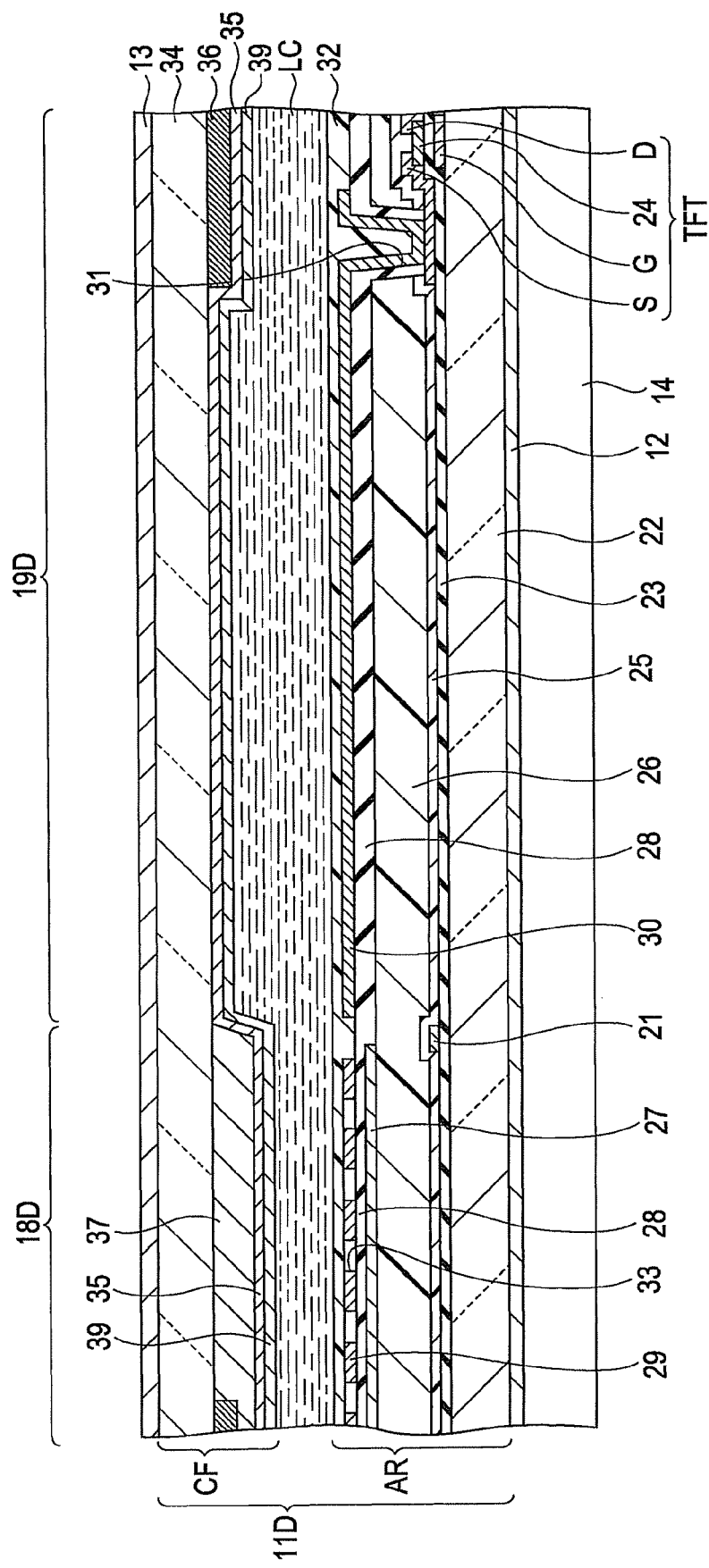
FIG. 10 is a sectional view projected in the direction of an arrow of line X-X of FIG. 9.
Figure 11:
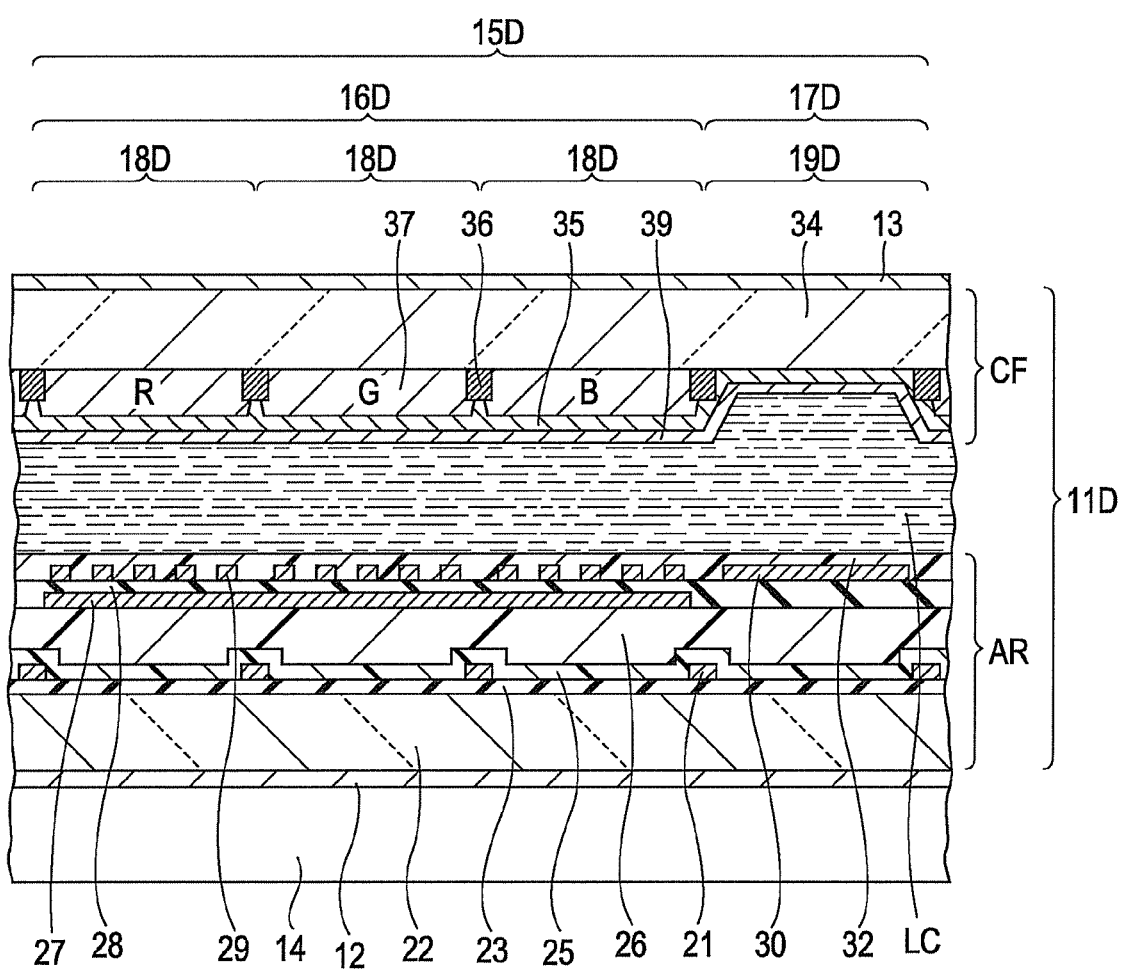
FIG. 11 is a sectional view projected in the direction of an arrow of line XI-XI of FIG. 9.

FIG. 1 a plan view illustrating one pixel of a liquid crystal display device according to a first embodiment by projecting it through a color filter substrate. FIG. 2 is a sectional view projected in the direction of an arrow of line II-II of FIG. 1. FIG. 3 is a sectional view projected in the direction of an arrow of line III-III of FIG. 1 of a first embodiment. FIG. 4 is a plan view illustrating one pixel of a liquid crystal display device according to a second embodiment by projecting it through a color filter substrate. FIG. 5 is a sectional view projected in the direction of an arrow of line V-V of FIG. 4. FIG. 6 is a sectional view projected in the direction of an arrow of line VI-VI of FIG. 4. FIG. 7 is a sectional view illustrating a modification of the second embodiment corresponding to FIG. 5. FIG. 8 is a corresponding sectional view illustrating a modification of the second embodiment corresponding to FIG. 6. FIG. 9 is a plan view illustrating one pixel of a liquid crystal display device according to a third embodiment by projecting it through a color filter substrate. FIG. 10 is a sectional view projected in the direction of an arrow of line X-X of FIG. 9. FIG. 11 is a sectional view projected in the direction of an arrow of line XI-XI of FIG. 9.

The term "surfaces" of an array substrate and a color filter substrate herein mean a surface on which various wirings are formed and a surface facing liquid crystal. In various drawings used to describe the invention in the present specification, scales of layers and members may be set differently from real scales to show the layers and members in the recognizable size on figures and do not have to be proportional to the real scales.

First Embodiment

A liquid crystal display device 10A of a first embodiment has an FFS mode display region 16A for color display which is driven by a lateral electric field mode and a viewing angle control region 17A driven by a longitudinal electric field mode, and a structure of main part will be described with reference to FIGS. 1 to 3. As shown in FIGS. 2 and 3, the liquid crystal display device 10A of the first embodiment has a liquid crystal display panel 11A, a first polarizing plate 12 is attached to the rear surface of the liquid crystal display panel 11A and a second polarizing plate 13 is attached to the display surface of the liquid crystal display panel 11A. The rear surface of the first polarizing plate 12 is provided with a backlight unit 14.

As shown in FIGS. 2 and 3, the liquid crystal display panel 11A has a structure in which a liquid crystal layer LC is interposed between an array substrate AR and a color filter substrate CF. The display region 16A operates in the FFS mode and the viewing angle control region 17A operates in an ECB mode. The liquid crystal layer LC can be shared. The liquid crystal display panel 11A has a plurality of pixels 15A arranged in a row direction (X-axis direction of FIG. 1) and a column direction (Y-axis direction of FIG. 1). As shown in FIG. 1, one pixel 15A is composed of a display region 16A and a viewing angle control region 17A placed adjacent to the display region 16A. The display region 16A is composed of, for example, three-color display sub-pixels 18A of red R, green G, and blue B, and color of each pixel is determined by mixture of these colored rays. The viewing angle control region 17A has one viewing angle control sub-pixel 19A.

As shown in FIG. 1, any of the display sub-pixels 18A of the array substrate AR and the viewing angle control sub-pixel 19A is provided with a scan line 20 extending in the X-axis direction and made of a metal, such as aluminum and molybdenum, a signal line 21 extending in the Y-axis direction and made of a metal, such as aluminum and molybdenum, and a thin film transistor TFT disposed adjacent to an intersection of the scan line 20 and the signal line 21. The TFTs of the display sub-pixels 18A and the TFT of the viewing angle control sub-pixel 19A have the same structure.

A base of the array substrate AR is a first transparent substrate 22 made of a material which is transparent and has an insulating characteristic, such as glass, quartz, or plastic. Of the surfaces of the first transparent substrate 22, the scan lines 20 are formed on the surface facing to liquid crystal LC. Gate electrodes G extend from the scan lines 20. A transparent gate insulating film 23 made of silicon nitride or silicon oxide is stacked to cover the scan lines 20 and the gate electrodes G. A semiconductor layer 24 made of amorphous silicon or poly crystalline silicon is formed on the gate insulating film 23 which overlaps the gate electrode G in a plan view. A signal line 21 is formed on the gate insulating film 23. A source electrode S extends from the signal line 21 and the source electrode S is partially in contact with the surface of the semiconductor layer 24.

Furthermore, the drain electrode D which is simultaneously formed with the signal line 21 and the source electrode S by the same material as the signal line 21 and the source electrode S is provided on the gate insulating film 23, and the drain electrode D is partially in contact with the semiconductor layer 24 as it is placed adjacent to the source electrode S. A region surrounded by the scan line 20 and the signal line 21 of the liquid crystal display panel 11A which are adjacent to each other corresponds to one sub-pixel. The gate electrode G, the gate insulating film 23, the semiconductor layer 24, the source electrode S, and the drain electrode D constitute a thin film transistor TFT serving as a switching element. Further, a transparent passivation film 25 made of silicon nitride or silicon oxide is stacked to an exposed portion of the signal line 21, the thin film transistor TFT, and the gate insulating film 23. An interlayer film (planarizing resin layer) 26 which is made of a transparent resin, such as photoresist, and has a planarized surface is formed to cover the passivation film 25.

In the display region 16A, a lower electrode 27 made of a transparent conductive material, such as Indium Thin Oxide (ITO) and Indium Zinc Oxide (IZO), is formed to cover the interlayer film 26 and to overlap with both of adjacent display sub-pixels 18A. The lower electrode 27 is connected to a common wiring (not shown) at a peripheral area of the display region 16A and serves as a common electrode. A transparent inter-electrode insulating film 28 made of silicon nitride or silicon oxide is stacked to cover the lower electrode 27 of the display region 16A and the interlayer film 26 of the viewing angle control region 17A. An upper electrode 29 made of a transparent conductive material, such as ITO and IZO, is formed on each of the display sub-pixels 18A to cover the inter-electrode insulating film 28, and a viewing angle control pixel electrode 30 is formed in the viewing angle control sub-pixel 19A.

In the display sub-pixel 18A, a contact hole 31 reaching the drain electrode D of the TFT is formed penetrating through the inter-electrode insulating film 28, the lower electrode 27, the interlayer film 26, and the passivation film 25. The upper electrode 29 is electrically connected to the drain electrode D of the TFT. Accordingly, the upper electrode 29 serves as the pixel electrode. In a similar manner, in the viewing angle control sub-pixel 19A, a contact hole 31 reaching the drain electrode D of the TFT is formed penetrating through the inter-electrode insulating film 28, the interlayer film 26, and the passivation film 25. The viewing angle control pixel electrode 30 is electrically connected to the drain electrode D of the TFT. A first 32 made of, for example, polyimide is stacked to cover the surfaces of the upper electrode 29 and the viewing angle control pixel electrode 30. The first 32 undergoes rubbing processing performed in a direction to which the signal line 21 extends.

The upper electrode 29 is provided with a slit-like opening (hereinafter, referred to as "slit") 33 having a shape of "<" which extends in a direction in which the signal line 21 extends. Since the display sub-pixel 18A is elongate in a longitudinal direction, when the slit 33 extends in a lateral direction, the number of ends of the slit 33 becomes larger. The ends of the slit 33 become abnormal alignment region of the liquid crystal molecules. Accordingly, in the liquid crystal display device 10A of the first embodiment, as shown in FIG. 1, the number of ends of the slit 33 is reduced and lowering of an aperture ratio is reduced by setting the Y-axis direction as the extension direction of the slit 33.

The extension direction of the "<"-shaped slit 33 inclines to the rubbing direction at about +5° or −5°. If all of the slits 33 are made to incline with respect to the rubbing direction in a clockwise direction or a counter clockwise direction, a phenomenon of changing in colors according to viewing direction occurs because liquid crystal molecules are twisted in one direction. This is because appearance retardation changes according to a viewing direction of the liquid crystal molecules. In order to reduce such phenomenon, in the liquid crystal display panel 11A of the first embodiment, a domain in which the extension direction of the slit 33 inclines with respect to the clockwise direction at +5° and a domain in which the extension direction of the slit 33 inclines at −5° are provided.

A base of the color filter substrate CF is a second transparent substrate 34 made of glass, quartz, or plastic, which is transparent and has insulating characteristic. A common electrode 35 made of a transparent conductive material, such as ITO and IZO, is formed in the lowermost layer of the second transparent substrate 34 (herein, the term lowermost layer means a layer formed on the transparent substrate in the first place in manufacturing the color filter substrate or the array substrate). Accordingly, a light shielding member 36 made of resin having light shielding characteristic is formed on the common electrode 35 at a place which faces the scan line 20 and the signal line 21. A color filter layer 37 is formed in the display sub-pixels 18A such that it can allow different colored rays, for example, R, G, and B or a colorless ray, to pass therethrough in different display sub-pixels 18A.

An overcoat layer 38 made of transparent resin, such as photoresist, is stacked to cover the light shielding member 36 and the color filter layer 37. The overcoat layer 38 is formed to even the stepped surface of the substrate which is owing to the color filter layer 37 for different colors and keep the impurities eluting from the light shielding member 36 and the color filter layer 37 from intruding into the liquid crystal layer LC. A second 39 made of polyimide is formed to cover the overcoat layer 38 and the exposed portion of the common electrode 35. The second 39 undergoes rubbing processing performed in the opposite direction to the first 32.

The array substrate AR and the color filter substrate CF formed through the above-mentioned steps are placed to face each other, and bonded to each other by providing a sealing member (not shown) at a peripheral area of both substrates. After that, a gap between both substrates is filled with liquid crystal having homogeneous alignment, so that the liquid crystal display panel 11A of the liquid crystal display device 10A according to the first embodiment is obtained. Furthermore, a spacer (not shown) is formed on the color filter substrate CF in order to maintain a predetermined thickness of the liquid crystal layer CL.

With the above-described structure, in the display sub-pixel 18A, if the TFT turns ON, electric field is generated between the lower electrode 27 and the upper electrode 29, and alignment of the liquid crystal molecules of the liquid crystal layer LC changes. With such an operation, light transmittance of the liquid crystal layer LC changes and it is possible to display an image in the FFS mode. An area in which the lower electrode 27 and the upper electrode 29 face each other with the inter-electrode insulating film 28 interposed therebetween constitutes an auxiliary capacitor. Accordingly, when the TFT turns OFF, the auxiliary capacitor maintains the electric field between the lower electrode 27 and the upper electrode 29 for a predetermined time. In the display sub-pixel 18A, since the common electrode 35 of the color filter substrate CF serves as a shielding electrode, it is possible to prevent the display image from distorting by electrostatic charge applied to the liquid crystal display panel 11A from finger of people and so on.

In the viewing angle control sub-pixel 19A, when the TFT turns ON, electric field is generated between the viewing angle control pixel electrode 30 of the array substrate AR and the common electrode 35 of the color filter substrate CF, and alignment direction of the liquid crystal molecules of the liquid crystal layer LC which are homogeneously aligned changes to a direction which is perpendicular to the display surface. For such a reason, in the viewing angle control sub-pixel 19A, since light leakage of an achromatic color occurs, it is difficult to recognize the display region 16A from left and right sides and appearance viewing angle of the display region 16A is narrowed.

In this manner, with a structure in which the common electrode 35 of the viewing angle control sub-pixel 19A is extended to the display region 16A and used as a shielding common electrode of the display sub-pixel 18A for anti-electrostatic charge, it is possible to provide reasonable liquid crystal display devices 10A because there is no need to provide an additional shielding member for anti-electrostatic charge in the liquid crystal display devices. Since the common electrode 35 is formed in the lowermost layer of the second transparent substrate 34, the common electrode 35 is spaced apart from the upper electrode 29 to the maximum extent possible, so that influence of the electric field generated in the common electrode 35 to the electric field for display is reduced.

In the liquid crystal display device 10A of the first embodiment, the common electrode 35 is formed on the liquid crystal layer side surface of the transparent substrate. Accordingly, the liquid crystal display device 10A is less scratched as compared to the liquid crystal display device disclosed in JP-A-2008-209529 in which the anti-electrostatic charge shielding member is formed on the display side surface of the transparent substrate. Moreover, in the liquid crystal display device 10A of the first embodiment, since the viewing angle control sub-pixel 19A is driven by the longitudinal electric field mode, it is possible to set the cell thickness of the viewing angle control sub-pixel 19A larger than that of the display sub-pixel 18A set suitable for the FFS mode as compared to the liquid crystal display device disadjacentd in JP-A-2007-178736 in which the viewing angle control sub-pixel 19A is driven by the lateral electric field mode. Accordingly, it is possible to attain sufficient viewing angle control effect. Furthermore, the product Δnd of optimum refractive index anisotropy Δn and the thickness of liquid crystal layer d is about 360 nm in the display sub-pixel 18A and 600 nm in the viewing angle control sub-pixel 19A.

The upper electrode 29 of the display sub-pixel 18A is formed in the same layer as the viewing angle control pixel electrode 30 of the viewing angle control sub-pixel 19A and serves as the pixel electrode. Accordingly, in the display sub-pixel 18A and the viewing angle control sub-pixel 19A, it is possible to harmonize the manufacturing processes of the contact holes 31 extending to the drain electrodes of the TFTs, so manufacturing is made simplified.

Even though the common electrode 35 is in the floating state, the shielding effect and the viewing angle control effect are high. However, a viewing angle control voltage, for example, a common potential, is applied between the common electrode 35 and the viewing angle control pixel electrode 30, it is possible to more effectively attain the shielding effect and the viewing angle control effect.

Second Embodiment

Next, a liquid crystal display device 10B of a second embodiment will be described with reference to FIGS. 4 to 6. FIGS. 4 to 6 correspond to FIGS. 1 to 3 relating to the liquid crystal display device 10A of the first embodiment. Accordingly, in the liquid crystal display device 10B of the second embodiment, like elements as in the liquid crystal display device 10A of the first embodiment are denoted by like reference symbols. In the case in which the reference symbols include a character therein, the character may be changed to the letter "B" and the description thereof will be omitted.

The differences between the liquid crystal display device 10B of the second embodiment and the liquid crystal display device 10A of the first embodiment are as follows:

(1) The liquid crystal display device 10A of the first embodiment relates to color display, and the liquid crystal display device 10B of the second embodiment relates to monochrome display;

(2) In the liquid crystal display device 10A of the first embodiment, while the upper electrode 29 serves as the pixel electrode and the lower electrode 27 serves as the common electrode, in the display sub-pixel 18B of the second embodiment, the upper electrode 29 serves as the common electrode and the lower electrode 27 serves as the pixel electrode;

(3) In the liquid crystal display device 10A of the first embodiment, the common electrode 35 is formed direct on the surface of the second substrate 34, but in the liquid crystal display device 10B of the second embodiment, a light shielding member 36 is formed in the lowermost layer of the second substrate 34 and the common electrode 35 covers the surface of the light shielding member 36 and the exposed surface of the second substrate 34; and (4) The slit 33 formed in the upper electrode 27 of the second embodiment does not have a shape of "<" but has a straight line shape which parallels the extension direction of the signal line 21 like the slit 33 of the first embodiment.

As shown in FIG. 4, the liquid crystal display device 10B of the second embodiment has a display region 16B for monochrome display which operates in the FFS mode and a viewing angle control region 17B which operates in ECB mode of the longitudinal electric field mode. Shapes of the display sub-pixel 18B and the viewing angle control sub-pixel 19B in a plan view are rectangular shapes unlike the "<" shape of the liquid crystal display device 10A of the first embodiment.

In the liquid crystal display device 10B of the second embodiment, a structure of the viewing angle control sub-pixel 19B of the array substrate AR is the same as that of the viewing angle control sub-pixel 19A of the array substrate AR of the liquid crystal display device 10A of the first embodiment. Accordingly, in the viewing angle control sub-pixel 19B of the liquid crystal display device 10B of the second embodiment, a contact hole 31 is formed to reach the drain electrode D of the TFT, penetrating through the inter-electrode insulating film 28, the interlayer film 26, and the passivation film 25. On the other hand, in the display sub-pixel 18B, a contact hole 31 is formed to reach the drain electrode D of the TFT, penetrating through the interlayer film 26 and the passivation film 25. The slit 33 formed in the upper electrode 27 of the second embodiment has a straight line shape which is in parallel with the extension direction of the signal line 21. Accordingly, rubbing directions of the first 32 and the second 39 incline to the extension direction of the slit 33 at 5°.

As described above, in the liquid crystal display device 10B of the second embodiment, since the upper electrode 27 of the display sub-pixel 18B serves as the common electrode, the upper electrode 27 is closer to the common electrode 35 for anti-electrostatic charge than the lower electrode 29 serving as the display pixel electrode. Thus, common electrode 35 causes little influence on the display electric field.

Further, since the light shielding member 36 is covered with the common electrode 35, the common electrode 35 can prevent impurities from eluting from the light shielding member 36. With this structure, it is possible to omit the overcoat layer 38 used in the liquid crystal display device 10A of the first embodiment.

Modification of Second Embodiment

In the liquid crystal display device 10B of the second embodiment, a viewing angle control pixel electrode 30 of a viewing angle control sub-pixel 19B is formed on an inter-electrode insulating film 28, and an upper electrode 29 of a display sub-pixel 18B is also formed on the inter-electrode insulating film 28. However, in the liquid crystal display device 10B of the second embodiment, the viewing angle control pixel electrode 30 of the viewing angle control sub-pixel 19B can be formed under the inter-electrode insulating film 28, i.e. on the interlayer film 26. A liquid crystal display device 10C which is a modification of the second embodiment will be described with reference to FIGS. 7 and 8.

Since a plan view obtained by projecting a color filter substrate CF of the liquid crystal display device 10C which is the modification of the second embodiment is the same as FIG. 4, the plan view may be omitted. The liquid crystal display device 10C of the modification of the second embodiment is different from the liquid crystal display device 10B of the second embodiment from only one point of view in which the viewing angle control pixel electrode 30 is formed on the interlayer film 26 like the lower electrode 27, but other parts of the liquid crystal display device 10 are the same as the liquid crystal display device 10B of the second embodiment. Here, like elements in the liquid crystal display device 10C which is the modification of the second embodiment and the liquid crystal display device 10B of the second embodiment are denoted by like reference symbols. When the reference symbols include characters, the characters are changed to the letter "C" and detailed description thereof will be omitted.

According to the liquid crystal display device 10C of the modification of the second embodiment, since the contact holes 31 used to electrically connect the viewing angle control pixel electrode 30 and the lower electrode 27 to the drain electrode D, respectively, can be simultaneously formed, and the viewing angle control pixel electrode 30 and the lower electrode 27 also can be simultaneously formed, it is possible to reduce the number of manufacturing processes.

Third Embodiment

Next, a liquid crystal display device 10D of a third embodiment will be described with reference to FIGS. 9 to 11. FIGS. 9 to 11 correspond to FIGS. 4 to 6, respectively which show the liquid crystal display device 10B of the second embodiment. In the liquid crystal display device 10D of the third embodiment, like elements when the device 10D is compared with the liquid crystal display device 10B of the second embodiment are denoted by like reference symbols. When the reference symbols include a character, the character is changed to the letter "D" and the detailed description thereof will be omitted.

A structure of the liquid crystal display device 10D of the third embodiment and the liquid crystal display device 10B of the second embodiment are different from each other in that the liquid crystal display device 10B of the second embodiment is to display monochrome images but the liquid crystal display device 10D of the third embodiments is to display color images. As shown in FIG. 9, one pixel 15D of the liquid crystal display device 10D is composed of a display region 16D and a viewing angle control region 17D disposed adjacent to the display region 16D. The display region 16D is composed of display sub-pixels 18D for display of three colors, red (R), green (G), and blue (B). The viewing angle control region 17D is provided with one viewing angle control sub-pixel 19D.

As shown in FIGS. 10 and 11, a structure of an array substrate AR of each of the display sub-pixels 18D of the liquid crystal display device 10D of the third embodiment is substantially the same as a structure of the array substrate AR of each of the display sub-pixels 18B of the second embodiment. In the color filter CF of the third embodiment, the light shielding member 36 is formed in the lowermost layer of the second transparent substrate 34, and the display sub-pixel 18D is provided with the color filter layer 37 for each display sub-pixel 18D which allows different colors, for example, R, G, B, or a colorless ray to pass therethrough. Accordingly, the common electrode 35 is formed to cover the light shielding member 36 and the color filter layer 37 and the second 39 is formed to cover the common electrode 35. The second 39 undergoes a rubbing processing performed in a direction which is opposite to a rubbing direction of the first 32.

According to the liquid crystal display device 10D of the third embodiment, since the light shielding member 36 and the color filter layer 37 are covered with the common electrode 35, the common electrode 35 can keep impurities from eluting from the light shielding member 36 and the color filter layer 37. For such a reason, it is possible to omit an overcoat layer used in the liquid crystal display device 10A of the first embodiment.

In the liquid crystal display devices 10A to 10D according to the first to third embodiments (including the modification of the second embodiment), the display sub-pixel operate in the FFS mode are described. However, the invention can also attain the same effects as the cases in which the display sub-pixel operates in the IPS mode as long as the viewing angle control sub-pixel is driven by the longitudinal electric field mode. In such cases, pixel electrodes of the display sub-pixel and the common electrode may be formed to have comb-like form so that they can engage with each other in a state in which they are electrically insulated from each other. Since such a structure is already well known, the detailed description thereof will be omitted.

What is claimed is:

1. A liquid crystal display device comprising:
 a first substrate and a second substrate which face each other with a liquid crystal layer interposed therebetween,
 a display sub-pixel and a viewing angle control sub-pixel are placed adjacent to each other for each of pixels, the first substrate is provided with a pixel electrode and a common electrode driven by a lateral electric field mode in the display sub-pixel, and is provided with a viewing angle control electrode in the viewing angle control sub-pixel, and wherein the second substrate on a liquid crystal layer side is provided with a transparent conductive electrode formed to overlap with both of the display sub-pixel and the viewing angle control sub-pixel.

2. The liquid crystal display device according to claim 1, wherein liquid crystals are homogeneously aligned and wherein a rubbing direction of an and an optical axis direction of the liquid crystals with respect to the rubbing direction in the viewing angle control sub-pixel are the same as those in the display sub-pixel.

3. The liquid crystal display device according to claim 1, wherein the transparent conductive electrode is formed in a lowermost layer of the second substrate.

4. The liquid crystal display device according to claim 1, wherein the pixel electrode and the common electrode driven by the lateral electric field mode are composed of a lower common electrode and an upper pixel electrode provided with a plurality of slits, with an insulating film interposed therebetween, and operate in an FFS mode.

5. The liquid crystal display device according to claim 1, wherein the pixel electrode and the common electrode driven by the lateral electric field mode are composed of a lower pixel electrode and an upper common electrode provided with a plurality of slits, with an insulating film interposed therebetween, and operate in an FFS mode.

6. The liquid crystal display device according to claim 5, wherein the viewing angle control electrode is formed in the same layer as the lower pixel electrode.

7. The liquid crystal display device according to claim 1, wherein the second substrate has a resinous light-shielding member and the transparent conductive electrode is formed to cover the resinous light-shielding member.

8. The liquid crystal display device according to claim 1, wherein the second substrate has a color filter layer and the transparent conductive electrode is formed to cover the color filter layer.

9. The liquid crystal display device according to claim 1, wherein a common voltage is applied to the transparent conductive electrode.

\* \* \* \* \*